March 11, 1952 — G. DEMOS — 2,588,491

TRUCK CARRIER CLAMP

Filed Feb. 2, 1951 — 2 SHEETS—SHEET 1

INVENTOR
GEORGE DEMOS
BY Toulmin & Toulmin
ATTORNEYS

March 11, 1952 G. DEMOS 2,588,491
TRUCK CARRIER CLAMP
Filed Feb. 2, 1951 2 SHEETS—SHEET 2

INVENTOR
GEORGE DEMOS
BY *Toulmin & Toulmin*
ATTORNEYS

Patented Mar. 11, 1952

2,588,491

UNITED STATES PATENT OFFICE 2,588,491

TRUCK CARRIER CLAMP

George Demos, Fort Wayne, Ind., assignor to Kenosha Auto Transport Corporation, Springfield, Ohio, a corporation of Ohio Application February 2, 1951, Serial No. 209,141

5 Claims. (Cl. 280—33.05)

This invention relates to means for transporting motor vehicles. More particularly, the invention is concerned with a novel structural arrangement of a "saddle mount" for the securing of one vehicle to another to facilitate delivery of the vehicles to dealers from the manufacturers or drive away companies.

Safety in transportation is a primary requirement of the drive away companies for all of the component structures of the drive away units. In this connection it should be noted that the vehicles under discussion are delivered by one of several basic methods:

First: A single driver may deliver a single vehicle simply by operation of the unit under its own power;

Secondly: There is the "tow bar" method in which a first driven vehicle has secured to it a second towed vehicle by means of a rigid tow bar;

Thirdly: A vehicle may have its forward end raised and secured to the rear end of a carrier vehicle. This type of securing means is known as a saddle mount; and Fourth: Where the structure of the vehicles permit, one truck may be mounted upon the chassis of another and carried thereby, and in a variation of this method a towed vehicle may also be secured to the carrier vehicle, thus permitting the delivery of three trucks with one driver. The nature of the apparatus, of course, frequently prohibits this latter method.

With regard to the safety factor, the drive away organizations have found rather surprisingly that trucks delivered singly have a higher accident frequency ratio than any of the other methods, and that the rigid tow bar arrangements are next highest in order in the matter of accident frequency, while those of the saddle mount type are in the third and lower accident classification.

Accordingly, while the accident rates are in themselves relatively low, it is desirable wherever possible to utilize the saddle mount and carrier methods, or a variation thereof, to improve safety conditions.

Further, the economy of transport is, of course, greatly increased by the delivery of more than one truck by a single driver.

Trucks of the platform bed type and stake bed type such as small one and a half ton units, have generally been delivered singly, although structural arrangements for their delivery in pairs have been devised. In known arrangements of the latter kind a saddle mounting may be provided on the rear of a towing vehicle and the forward end of the towed vehicle is raised and secured on this mount and towed to its destination in its inclined position.

It is a primary object of the present invention to provide a vehicle mounting of the saddle type of improved safety characteristics.

It is an important object of this invention to provide a new and improved sectional structure of a saddle mount for the transportation of vehicles.

It is a further object of this invention to provide a new and improved structure which may be readily secured to the bed of a stake or platform type vehicle without alteration of the said bed.

It is another important object of this invention to provide new and improved clamping means between the mount structure and the truck bed.

It is a particular object of the present invention to provide a saddle mount structure for stake and platform bed trucks which will place the transportation of these vehicles in a class 3 safety category rather than in the higher accident frequency ratio bracket of class 1 referred to hereinbefore.

The invention accordingly comprises a novel structural arrangement of the saddle mount type in which a pivotal clamping member is secured by suitable means transversely between forwardly extending supports secured to the bed of the carrier vehicle.

The invention and further objects thereof will be apparent by reference to the following detailed description taken in connection with the accompanying drawings in which.

Figure 1:
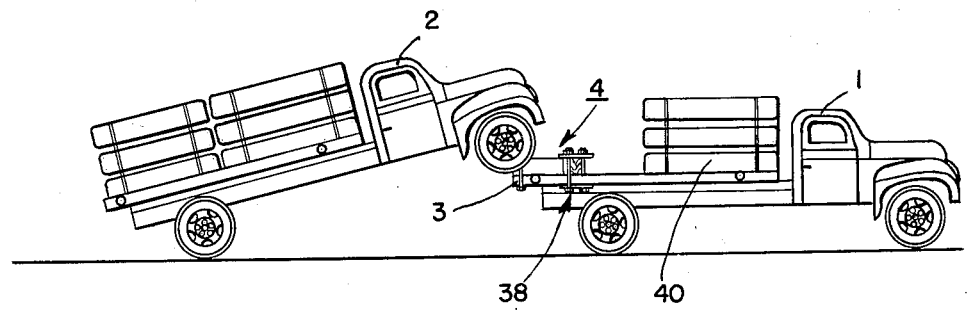
Figure 1 is a view in side elevation showing the manner in which one vehicle carries another in accordance with the precepts of this invention.

Referring to the drawings, there is shown in Figure 1 a carrier truck 1 having a carried truck 2 secured on the rear 3 thereof by the mounting of invention designated generally at 4.

Figures 3, 4:
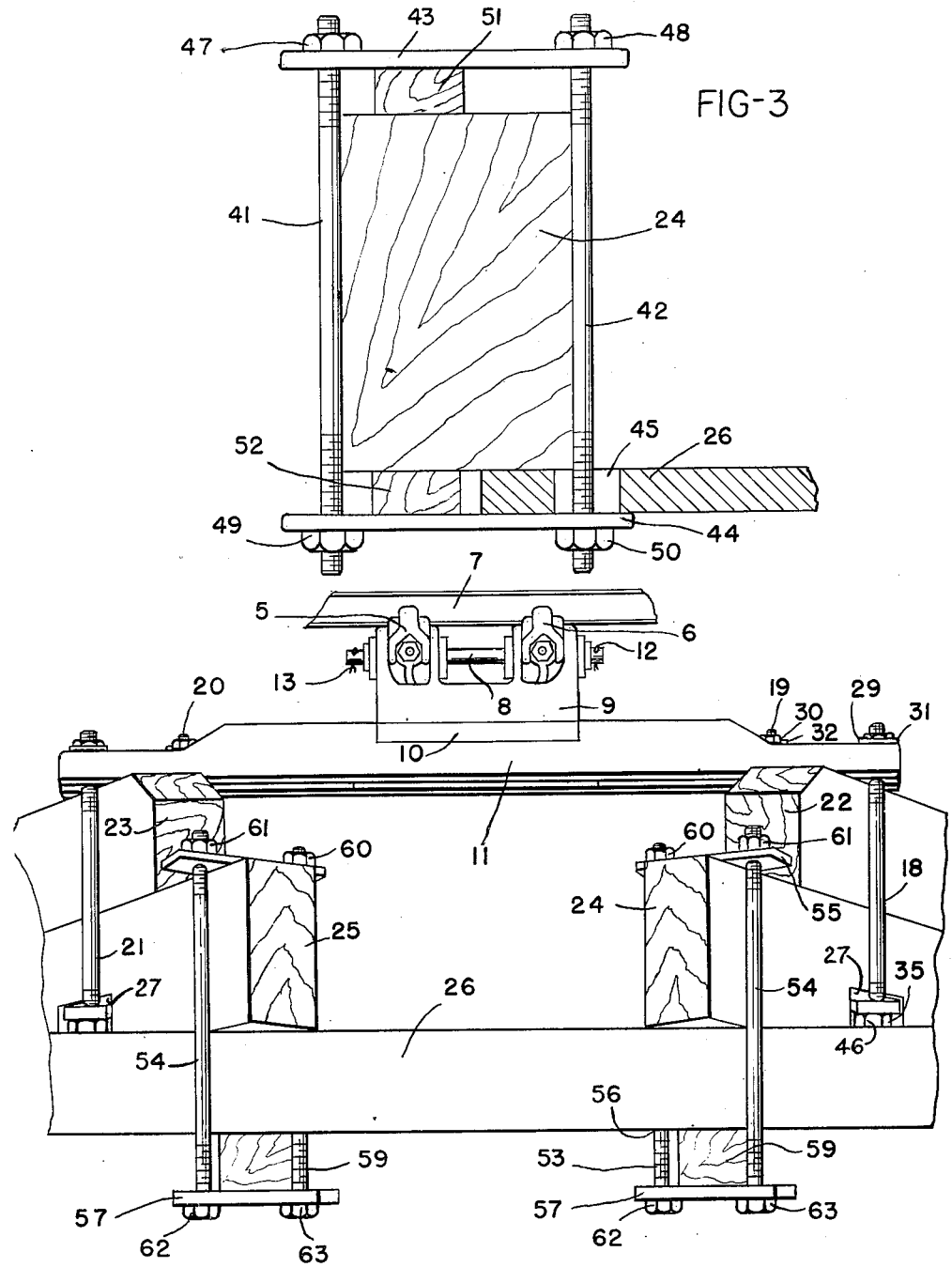
Figure 3 is a sectional view showing a portion of the vehicle bed and the means of clamping the forward end of the support thereto.
Figure 4 is a view of the rear end of the carrier truck with the mounting of the invention in position thereon.

As shown more clearly in Figure 4 the mounting comprises pivotally mounted jaw members 5 and 6 fixedly secured to an axle 7 of the carried truck. The jaw members 5 and 6 are mounted in spaced relation on a shaft 8 passing through a supporting frame 9, welded or otherwise fixedly secured to a plate 10 which is mounted on a cross piece 11, preferably of heavy metal construction.

The pivot shaft 8 preferably extends beyond the opposing ends of the frame 9 and is provided with pins 12 and 13 or other retaining means at the outer ends thereof.

It will be understood that other suitable means may be employed for securing the axle or other mounting of the carried truck to the carrier vehicle, and that the invention is not limited to the particular jaw means set forth, the only requirement being that clamping means be provided which are capable of securing the carried vehicle on the carrier in substantially fixed relation therewith and be suitably mounted to pivot and permit tracking of the carried vehicle with the carrier.

Opposing end portions of the cross piece 11 are provided with apertures on opposing ends through which metallic rod members 18, 19, 20 and 21, respectively, pass, a pair of such rods being provided at each end of the cross piece 11. These rod members may suitably be of approximately ¾ to 1 inch round stock in the embodiment shown.

Secured beneath the opposing ends of the cross piece 11 are wooden saddle blocks 22 and 23 which are mounted respectively on wood supports 24 and 25 extending forwardly on the bed 26 of the carrier vehicle. Supports 24 and 25 may be of about 3" by 6" size and are each slotted substantially transversely on the bottom sides thereof at 27 and 28. These slots 27 and 28 are each positioned beneath a pair of apertures in the cross piece 11.

Inasmuch as the securing means between the cross piece 11 and saddle block 22 and the support 24 are substantially identical to the securing means between the cross piece 11, the saddle block 23 and the support 25, only one of these means will be described herein in detail.

As noted hereinbefore a pair of rod members each designated 18 and 19 pass through apertures 14 and 15 in the one end of the cross piece 11; threaded upper ends of member 18 and 19 are secured to the top of the cross piece 11 by nuts 29 and 30, respectively, and washers 31 and 32 are interposed between the nuts and the cross piece.

The rod members 18 and 19 pass downwardly from the cross piece 11 on opposing sides of the saddle block 22 and the support 24. A plate member 46 passes through the slot 27 and the support 24 and is provided at opposing ends, extending on either side of the support 24, with apertures 33 and 34 through which the rod members 18 and 19, respectively, pass. The lower ends of members 18 and 19 are likewise threaded and receive nuts 35 and 36, respectively.

The support and/or the saddle block may be preferably grooved vertically to receive the rod members in intimate contact therewith and thus insure rigid engagement when the securing means have been assembled and the upper nuts 29 and 30 tightened down. Similarly, the other sides of these elements may be grooved when such is desired.

It will be noted that the arrangement of the elements associated with the support 25, that is the saddle block 23, and the rod members 20 and 21 are similar to those described in connection with the support 24.

Figure 2:
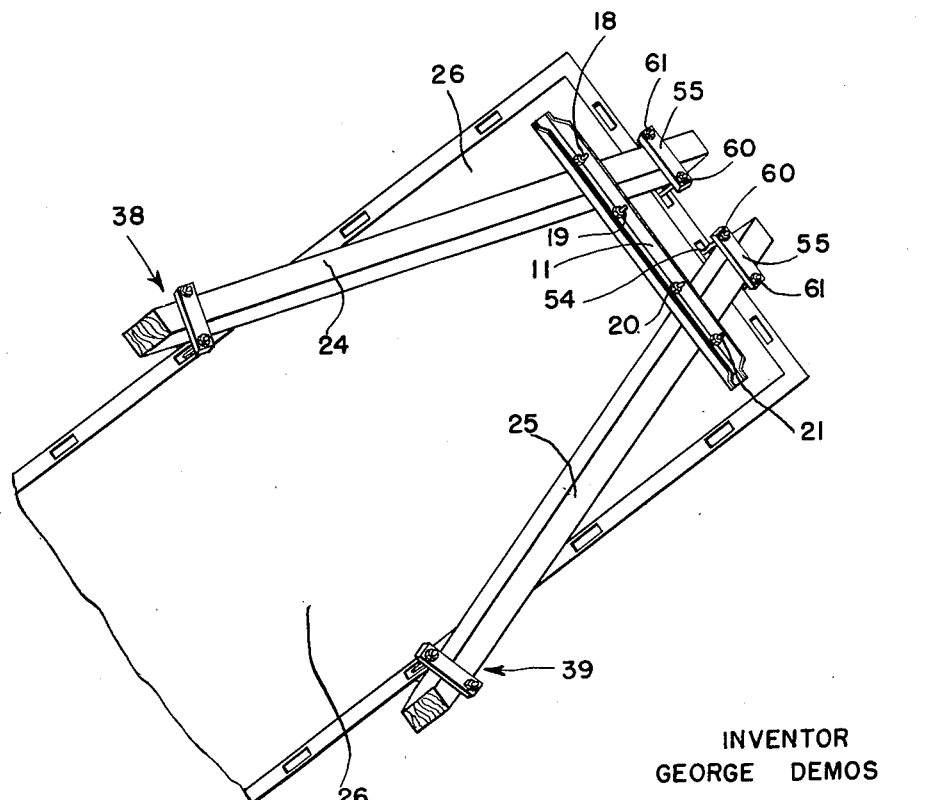
Figure 2 is a perspective view showing the mounting of this invention in position on the bed of a carrier vehicle.

The forwardly extending supports 24 and 25 on the bed 26 diverge from the cross piece 11, as shown in Figure 2, and the ends thereof are secured to the bed 26 as at 38 and 39. Again only the holding means for the support 24 will be described in detail since the holding means for the support 25 is substantially identical thereto.

The vehicle bed 26 on which the support 24 is positioned when the vehicle is of the stake rack type, is provided with apertures extending longitudinally of the bed and adjacent the edges thereof for the receipt of racks shown at 40 in Figure 1. By demounting the rear racks and transporting these in knocked down condition the apertures for the receipt of the racks become exposed and the forwardly extending support 24 may be readily secured to the bed by utilization of these apertures.

Thus as may be readily seen in Figure 3 the rod members 31 and 42, each provided similarly to the rod members 18, 19, 20 and 21 with opposed threaded end portions, pass down through an upper plate member 43 on opposing sides of the end portion of the support 24 and through a lower plate member 44. These plate members may be of half inch thickness or more depending upon the particular type of vehicle to be transported and the stress involved.

Returning to the rod member 41, this passes on the outer side of the bed 26, while rod member 42 passes through an aperture of the bed as shown at 45 in Figure 3. Securing means for this outer end of the support 24 is otherwise similar to that described in connection with the cross piece 11, the support 24 and the saddle block combination, except that in this instance it is necessary to incorporate the upper plate member 43 which nuts 47 and 48 engage. The lower plate member 44 is retained in position by nuts 49 and 50.

It should also be noted that where wood is utilized for the supports, it is generally desirable to use shimming members such as those shown at 51 and 52 in Figure 3. This arrangement insures that the rod members can be securely tightened down and rigid holding means thereby attained. It is also desirable to use a resilient member such as wood in instances where some of the components are of metal, since compression strains in the secured object and tension strains in the securing member are more readily attained thereby.

The supports 24 and 25 are secured to the back portion of the bed 26 in much the same manner as described in connection with the forward ends. In this instance with regard to support 24 rod member 53 (Figure 4) passes through a plate 55 and down the inner side of the support 24 through an aperture 56 in the bed 26 and then through the plate 57. The outer rod member 54 passes through the plate 55 and over the outside of the rear of the carrier vehicle and through plate 57 also. A wooden shim 59 is preferably secured between plate 57 and the lower portion of the bed 26 to secure adequate tensioning of the rod members 53 and 54 when the nuts 60, 61, 62 and 63 are secured on the threaded end portions of the said members.

There has thus been set forth a novel structural arrangement which permits the use of saddle mounts under the most severe carrier conditions, thus enabling vehicles to be transported in a manner which places them in a better safety category while also adding to the economy of transportation.

It will be apparent to those skilled in the art that the various structural members of this novel mounting may be of any material having the required physical properties for a given vehicle mounting. Wood or other shock absorbing material is, however, preferred for the absorption of shock effects in transit, but the inventive concept is not to be considered as limited thereto.

It should be further noted that the structure may be readily disassembled and that since the components particularly the wooden portions thereof set forth above do not contain bolt holes, and so forth, which may be subject to great wear under the stress of applied loads, that the structural parts may be repeatedly utilized for further mountings.

While a preferred specific embodiment of the invention is hereinbefore set forth, it is to be clearly understood that the invention is not to be limited to the exact constructions, mechanisms and devices illustrated and described, because various modifications of these details may be provided in putting the invention into practice within the purview of the appended claims.

I claim:
1. In a structure for supporting a carried motor vehicle upon the rear of a carrier motor truck having a horizontal stake bed with apertures therein the combination comprising, a horizontal support mounted on said bed and extending rearwardly thereof, clamping means having spaced vertically disposed rod members and spaced horizontally disposed plate members connecting said rod members together at opposing ends thereof, one said member passing through a said aperture and another said member passing outwardly of said bed, said clamping means enclosing said support at the forward end thereof in stress relation therewith.

2. In a structure for supporting a carried motor vehicle upon the rear of a carrier motor truck having a horizontal stake bed with apertures therein the combination comprising, a horizontal support mounted on said bed and extending rearwardly thereof, clamping means having spaced vertically disposed rod members and spaced horizontally disposed plate members connecting said rod members together at opposing ends thereof, securing means for said plate members on the opposing end of each of said rod members, one said member passing through a said aperture and another said member passing outwardly of said bed, said clamping means enclosing said support at the forward end thereof in stress relation therewith.

3. In combination with a pivotal mounting for supporting a carried motor vehicle upon the rear of a carrier motor truck the structure comprising a stake bed on said carrier motor truck having a pair of spaced apertures in the rear edge thereof, a pair of supports converging rearwardly on said bed and each having an end thereof extending over the said rear edge, and individual clamping means secured to said bed around the end of each support passed outwardly of said bed and through a said aperture thereof.

4. In combination with a pivotal mounting for supporting a carried motor vehicle upon the rear of a carrier motor truck the structure comprising a cross piece having openings therein, spaced saddle blocks supporting said cross piece, a support upholding each said saddle block and extending beyond the rear edge of said bed, a stake bed of said carrier motor truck having spaced apertures in the rear edge thereof, individual clamping means passed around each said support and outwardly of said rear edge and through said aperture, and a pair of clamping means one passed through a slot in each said support around said support and saddle block and secured to said cross piece through the said openings therein.

5. In combination with a pivotal mounting for supporting a carried motor vehicle upon the rear of a carrier motor truck the structure comprising a stake bed on said carrier motor truck having apertures in the lateral and rear edges thereof, a pair of spaced longitudinal supports extending rearwardly on said bed in converging relation, each said support having an end thereof extending beyond an edge of said bed, and individual clamping means securing an end of each support to said bed, each said means passing around one end of a said support through one said aperture of said bed and outwardly of said edge of said bed.

GEORGE DEMOS.

REFERENCES CITED

The following references are of record in the file of this patent:

UNITED STATES PATENTS

| Number | Name | Date |
|---|---|---|
| 1,705,381 | Snyder | Mar. 12, 1929 |
| 1,919,360 | Deucher | July 25, 1933 |
| 2,411,411 | Blair et al. | Nov. 19, 1946 |
| 2,451,880 | Seckel | Oct. 19, 1948 |